(12) United States Patent  
Bravi

(10) Patent No.: US 9,838,118 B2  
(45) Date of Patent: Dec. 5, 2017

(54) SKEW COMPENSATION IN AN OPTICAL COHERENT TRANSPONDER

(71) Applicant: Fujitsu Network Communications, Inc., Richardson, TX (US)

(72) Inventor: Emilio Bravi, Hillsdale, NJ (US)

(73) Assignee: Fujitsu Limited, Kawasaki (JP)

( * ) Notice: Subject to any disclaimer, the term of this patent is extended or adjusted under 35 U.S.C. 154(b) by 25 days.

(21) Appl. No.: 15/149,733

(22) Filed: May 9, 2016

(65) Prior Publication Data

US 2017/0324475 A1     Nov. 9, 2017

(51) Int. Cl.
*H04B 10/07* (2013.01)
*H04B 10/079* (2013.01)
*H04L 7/00* (2006.01)

(52) U.S. Cl.
CPC ..... *H04B 10/07955* (2013.01); *H04L 7/0041* (2013.01); *H04L 7/0075* (2013.01)

(58) Field of Classification Search
None
See application file for complete search history.

(56) References Cited

U.S. PATENT DOCUMENTS

| 9,654,226 | B1 * | 5/2017 | Bhandare | H04B 10/58 |
| 2003/0147577 | A1 * | 8/2003 | Kataoka | H04B 10/505 |
| | | | | 385/3 |
| 2007/0230617 | A1 * | 10/2007 | Tao | G02F 1/0123 |
| | | | | 375/302 |
| 2012/0251104 | A1 * | 10/2012 | Oberland | G02F 1/0123 |
| | | | | 398/38 |
| 2016/0099776 | A1 * | 4/2016 | Nakashima | H04B 10/50572 |
| | | | | 398/186 |
| 2016/0112138 | A1 * | 4/2016 | Alfiad | H04B 10/50572 |
| | | | | 398/182 |

* cited by examiner

*Primary Examiner* — Tesfaldet Bocure
(74) *Attorney, Agent, or Firm* — Baker Botts L.L.P.

(57) ABSTRACT

Systems and methods for reducing total skew in optical signals transmitted by optical coherent transponders without measuring the total skew are disclosed. The method may compensate for the in-phase/quadrature (I/Q) skew of optical signals in complex modulation formats. It may include providing input to a transponder to produce a periodic (and generally sinusoidal) output signal, providing the signal to an optical power meter, measuring the optical power of positive and negative harmonics of the signal while varying the amount of skew introduced by a de-skewing filter in the transponder, identifying the amount of skew introduced by the de-skewing filter when the minimum optical power measurement is taken, and causing the amount of skew introduced by the de-skewing filter to equal the identified skew offset by a one-half symbol delay. The system may provide better skew compensation using less expensive equipment than de-skewing methods based on existing skew measurement methods.

20 Claims, 8 Drawing Sheets

SKEW COMPENSATION IN AN OPTICAL COHERENT TRANSPONDER

BACKGROUND

Field of the Disclosure

The present disclosure relates generally to optical communication networks and, more particularly, to systems and methods for compensating for the in-phase/quadrature skew generated in optical coherent transponders.

Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), pulse-amplitude modulation (PAM), and quadrature amplitude modulation (QAM).

Optical networks may also include various optical elements, such as amplifiers, dispersion compensators, multiplexer/demultiplexer filters, wavelength selective switches (WSS), optical switches, couplers, etc. to perform various operations within the network. In particular, optical networks may include optical-electrical-optical (O-E-O) regeneration when the reach of an optical signal is limited and reconfigurable optical add-drop multiplexers (ROADMs).

In systems that convey information in the form of optical signals in optical coherent modulation formats (e.g., DP 16-QAM, DP-QPSK, etc.), the performance of the system is dependent on the relative phases of the In-phase/Quadrature (I/Q) components. Developers of components for optical networks might wish to measure the delay between the components of such signals, which is typically referred to as "skew", and to modify the design of the components to compensate for at least some of the skew. Existing skew measurement methods are not very accurate for complex modulation formats (such as 16-QAM), and the equipment needed to perform the measurements can be very expensive. For example, some existing skew measurement techniques rely on the use of expensive Optical Modulation Analyzers (OMAs). Similarly, some existing skew-compensation techniques rely on calibrated skew measurements of the type made by OMAs.

SUMMARY

In one aspect, a disclosed method is for reducing in-phase/quadrature (I/Q) skew in an optical coherent transponder. The method may include performing a plurality of measurements of the optical power of harmonics of an optical signal transmitted by the optical coherent transponder. Each measurement may be taken while a respective different amount of skew is introduced into the optical signal by a de-skewing filter of the optical coherent transponder. The method may also include identifying a minimum optical power value obtained during the plurality of measurements of optical power, determining an amount of skew that was introduced by the de-skewing filter when the minimum optical power value was obtained, and modifying the optical coherent transponder. Modifying the optical coherent transponder may include causing the amount of skew introduced by the de-skewing filter to be substantially equal to the amount of skew that was introduced by the de-skewing filter when the minimum optical power value was obtained plus an amount of skew representing a one-half symbol delay or to the amount of skew that was introduced by the de-skewing filter when the minimum optical power value was obtained minus an amount of skew representing a one-half symbol delay.

In any of the disclosed embodiments, performing the plurality of measurements may include taking a first measurement of optical power of the harmonics of an optical signal transmitted by the optical coherent transponder while a first amount of skew is introduced by the de-skewing filter. The method may also include, for each successive one of the plurality of measurements, varying the amount of skew introduced by the de-skewing filter by a fixed increment that is dependent on the minimum resolution by which the amount of skew is changeable.

In any of the disclosed embodiments, performing the plurality of measurements may include varying the amount of skew introduced by the de-skewing filter to include amounts of skew over a range of values that represents two symbols of delay.

In any of the disclosed embodiments, performing the plurality of measurements of the optical power of the harmonics of the optical signal may include taking measurements of the optical power of positive harmonics of the optical signal and taking measurements of the optical power of negative harmonics of the optical signal. The identified minimum optical power value may be obtained when taking a measurement of the optical power of a positive harmonic of the optical signal, and modifying the optical coherent transponder may cause the amount of skew introduced by the de-skewing filter to be substantially equal to the amount of skew that was introduced by the de-skewing filter when the minimum optical power value was obtained plus an amount of skew representing a one-half symbol delay.

In any of the disclosed embodiments, performing the plurality of measurements of the optical power of the harmonics of the optical signal may include taking measurements of the optical power of positive harmonics of the optical signal and taking measurements of the optical power of negative harmonics of the optical signal. The identified minimum optical power value may be obtained when taking a measurement of the optical power of a negative harmonic of the optical signal, and modifying the optical coherent transponder may cause the amount of skew introduced by the de-skewing filter to be substantially equal to the amount of skew that was introduced by the de-skewing filter when the minimum optical power value was obtained minus an amount of skew representing a one-half symbol delay.

In any of the disclosed embodiments, modifying the transponder may include changing a value of a configurable operating parameter of the de-skewing filter.

In any of the disclosed embodiments, the optical signal transmitted by the optical coherent transponder may be a sinusoidal signal or a combination of sinusoidal signals, and the method may further include filtering the optical signal to isolate a harmonic of the optical signal prior to performing the plurality of measurements.

In any of the disclosed embodiments, performing the plurality of measurements of the optical power of the harmonics of the optical signal may include taking measurements of the optical power using an optical power meter.

In any of the disclosed embodiments, the total skew in the optical coherent transponder may include an electrical skew component, an optical skew component, and the amount of skew introduced by the de-skewing filter, and the method may not be dependent on a measurement of the total skew.

In a further aspect, a system may include circuitry to receive optical signals transmitted by an optical coherent transponder under test. The system may also include an optical power meter including circuitry to perform a plurality of measurements of optical power of harmonics of an optical signal transmitted by the optical coherent transponder under test. Each measurement may be taken while a respective different amount of skew is introduced into the optical signal by a de-skewing filter of the optical coherent transponder. The system may also include a skew compensator including circuitry to identify a minimum optical power value obtained during the plurality of measurements of optical power, determine an amount of skew that was introduced by the de-skewing filter when the minimum optical power value was obtained, and modify the optical coherent transponder. To modify the optical coherent transponder, the system may include circuitry to cause the amount of skew introduced by the de-skewing filter to be substantially equal to the amount of skew that was introduced by the de-skewing filter when the minimum optical power value was obtained plus an amount of skew to represent a one-half symbol delay, or to the amount of skew that was introduced by the de-skewing filter when the minimum optical power value was obtained minus an amount of skew to represent a one-half symbol delay.

In any of the disclosed embodiments, to perform the plurality of measurements, the optical power meter may include circuitry to take a first measurement of optical power of the harmonics of an optical signal transmitted by the optical coherent transponder while a first amount of skew is introduced by the de-skewing filter, and for each successive one of the plurality of measurements, to take respective measurements of optical power of the harmonics of optical signals transmitted by the optical coherent transponder while the amount of skew introduced by the de-skewing filter differs from the amount of skew introduced by the de-skewing filter during a preceding measurement by a fixed increment. The fixed increment by which the amount of skew is changed may be dependent on the minimum resolution by which the amount of skew is changeable.

In any of the disclosed embodiments, to perform the plurality of measurements, the optical power meter may include circuitry to take the plurality of measurements while the amount of skew introduced by the de-skewing filter is varied to include amounts of skew over a range of values that represents two symbols of delay.

In any of the disclosed embodiments, to perform the plurality of measurements, the optical power meter may include circuitry to take measurements of the optical power of positive harmonics of the optical signal and to take measurements of the optical power of negative harmonics of the optical signal. The identified minimum optical power value may be obtained when a measurement of the optical power of a positive harmonic of the optical signal is taken, and to modify the optical coherent transponder, the system may include circuitry to cause the amount of skew introduced by the de-skewing filter to be substantially equal to the amount of skew that was introduced by the de-skewing filter when the minimum optical power value was obtained plus an amount of skew to represent a one-half symbol delay.

In any of the disclosed embodiments, to perform the plurality of measurements, the optical power meter may include circuitry to take measurements of the optical power of positive harmonics of the optical signal and to take measurements of the optical power of negative harmonics of the optical signal. The identified minimum optical power value may be obtained when a measurement of the optical power of a negative harmonic of the optical signal is taken, and to modify the optical coherent transponder, the system may include circuitry to cause the amount of skew introduced by the de-skewing filter to be substantially equal to the amount of skew that was introduced by the de-skewing filter when the minimum optical power value was obtained minus an amount of skew to represent a one-half symbol delay In any of the disclosed embodiments, to modify the transponder, the system may include circuitry to change a value of a configurable operating parameter of the de-skewing filter.

In any of the disclosed embodiments, the optical signal transmitted by the optical coherent transponder may be a sinusoidal signal or a combination of sinusoidal signals, and the system may further include one or more filters to isolate a harmonic of the optical signal prior to performance of the plurality of measurements.

In any of the disclosed embodiments, the optical power meter may include an optical spectrum analyzer.

In any of the disclosed embodiments, the total skew in the optical coherent transponder may include an electrical skew component, an optical skew component, and the amount of skew introduced by the de-skewing filter, and the modification of the optical coherent transponder may cause a reduction in the total skew in the optical coherent transponder.

In yet another aspect, a disclosed method is for de-skewing an optical coherent transponder. The method may include performing a plurality of measurements of optical power of harmonics of an optical signal transmitted by the optical coherent transponder. Each measurement may be taken while a respective different amount of skew is introduced by a de-skewing filter of the optical coherent transponder. The method may further include determining an amount of skew to be introduced by the de-skewing filter to reduce total skew in the optical coherent transponder, and modifying the optical coherent transponder to cause the amount of skew introduced by the de-skewing filter to be substantially equal to the determined amount of skew. The total skew in the optical coherent transponder may include an electrical skew component, an optical skew component, and the amount of skew introduced by the de-skewing filter, and determining the amount of skew to be introduced by the de-skewing filter may not be dependent on a measurement of the total skew.

In any of the disclosed embodiments, determining the amount of skew to be introduced by the de-skewing filter may include identifying a minimum optical power value obtained during the plurality of measurements of optical power, determining an amount of skew that was introduced by the de-skewing filter when the minimum optical power value was obtained, and applying an offset to the amount of skew that was introduced by the de-skewing filter when the minimum optical power value was obtained. Applying the offset may include adding an amount of skew representing a one-half symbol delay to the amount of skew that was introduced by the de-skewing filter when the minimum optical power value was obtained, or subtracting an amount of skew representing a one-half symbol delay from the amount of skew that was introduced by the de-skewing filter when the minimum optical power value was obtained.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
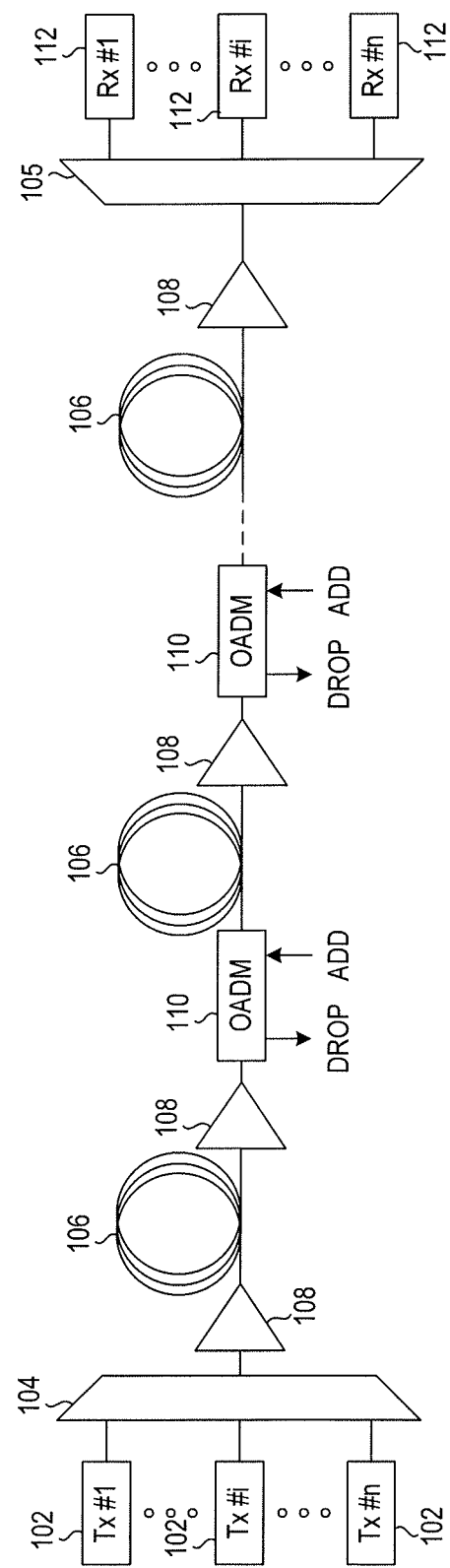
FIG. 1 is a block diagram of selected elements of an embodiment of an optical network, according to at least one embodiment.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Referring now to the drawings, FIG. 1 illustrates an example embodiment of optical network 101, which may represent an optical communication system. Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a channel that is included in an optical signal (also referred to herein as a "wavelength channel"). Each channel may carry a certain amount of information through optical network 101.

To increase the information capacity and transport capabilities of optical network 101, multiple signals transmitted at multiple channels may be combined into a single wide-band optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information included in the electrical signals onto a beam of light produced by the laser at a particular wavelength, and transmit the beam for carrying the signal throughout optical network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of an optical pump to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add and drop optical signals (for example at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels.

In FIG. 1, optical network 101 may also include receivers 112 coupled to demultiplexer 105. Each receiver 112 may receive optical signals transmitted at a particular wavelength or channel, and may process the optical signals to obtain (e.g., demodulate) the information (i.e., data) included in the optical signals. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), pulse-amplitude modulation (PAM), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may provide achievement of a greater bit rate for information transmission. PDM transmission comprises independently modulating information onto different polarization components of an optical signal associated with a channel. In this manner, each polarization component may carry a separate signal simultaneously with other polarization components, thereby enabling the bit rate to be increased according to the number of individual polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may include a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information may be transmitted over an optical network is the bit rate of transmission. The higher the bit rate, the greater the transmitted information capacity. Achieving higher bit rates may be limited by the availability of wide bandwidth electrical driver technology, digital signal processor technology and increases in the required OSNR for transmission over optical network 101.

As noted above, an optical network (such as Optical network 101) may include one or more optical transmitters to transmit optical signals through the optical network in specific wavelengths or channels. In some embodiments, these transmitters may include optical transponders, each of which may include a laser and a modulator to receive electrical and/or optical signals. The optical transponders may modulate the information included in the signals they receive onto a beam of light produced by the laser at a particular wavelength, and may transmit the beam for carrying the signal throughout the optical network. In some embodiments, the optical transponders may also perform signal regeneration. In some embodiments, the optical transponders may interface with a host system over a parallel interface. In some embodiments, the optical transponders may convert full-duplex electrical signals that they receive to full-duplex optical signals. In other embodiments, the optical transponders may convert an optical signal at one wavelength to an optical signal at another wavelength. Each such wavelength-converting transponder may receive an optical data signal (e.g., as client traffic) and may convert it first into the electrical domain and then into an optical data signal at a different wavelength for transmission over the optical network. For example, the transponder may convert the signal into a signal at a wavelength that is supported in a specific system for transmission over a specific optical network, according to the optical modulation scheme(s) implemented in the system. In some embodiments, the wavelength-converted optical data signals generated by each of multiple transponders may be combined together into a multi-wavelength optical signal using an optical multiplexer.

The relative phases of the in-phase and quadrature (I/Q) components in optical coherent modulation formats may be referred to as "in-phase/quadrature skew", "I/Q skew", or simply "skew". The in-phase/quadrature skew of the signals transmitted by an optical coherent transponder is one of the parameters that determines the performance and quality of the transponder. Therefore, during design and/or production of an optical coherent transponder, measurements of the combined electrical and optical skew may be made to ensure that the transponder is operating within acceptable skew limits. If not, modifications may be made to the transponder in an attempt to reduce the amount of I/Q skew in the optical signals transmitted by the transponder. However, existing skew measurement methods are not very accurate for complex modulation formats, and the equipment needed to perform the measurements can be very expensive. Attempts to modify the transponder to compensate for the I/Q skew using skew compensation techniques that are based on these existing measurement techniques do not always succeed. In addition, the accuracy and performance of existing skew measurement techniques and/or skew compensation techniques can be affected by background noise, jitter, power instability (such as amplitude instability), and/or pulse shape. In some embodiments of the present disclosure, a system and method for compensating for I/Q skew may provide better skew compensation using less expensive equipment than de-skewing methods based on existing skew measurement methods. Unlike with some existing de-skewing techniques, in some embodiments, these methods may not require the measurement of the total skew in an optical coherent transponder (which may include an electrical skew component, an optical skew component, and the amount of skew introduced by a de-skewing filter in the transponder) in order to de-skew the transponder. In addition, unlike with some existing techniques, the de-skewing techniques described herein may be unaffected by background noise, jitter, power instability (such as amplitude instability), and/or pulse shape.

During production of an optical coherent transponder, the manufacturer may wish to eliminate the initial I/Q skew (or total skew) of the transponder due to its design, or at least to reduce the I/Q skew (or total skew) to a level such that any residual skew in individual transponders can be compensated for without having to replace any of the underlying hardware components of the transponder. In some cases, a transponder may include a de-skewing filter that introduces some amount of skew into the signals that are transmitted by the transponder. In some cases, this de-skewing filter can be used to add additional skew or to subtract some amount of skew in order to compensate for the I/Q skew. However, if the initial skew is more than a one-half symbol delay (according to the modulation format), the direction of compensation can be unclear. This is sometimes referred to as the "one symbol uncertainty" problem. Therefore, in manufacturing, it may desirable that the transponder not have an I/Q skew that requires a skew compensation of more than a one-half symbol delay. In at least some embodiments of the present disclosure, optical filters and an optical power meter connected to a transponder may be used to determine the value of a de-skewing filter needed to compensate for the initial skew of the transponder, rather than more expensive equipment, such as an Optical Modulation Analyzer (OMA). As described in more detail herein, by analyzing the power of the harmonics of simulated sinusoids and minimizing the power of those harmonics (and assuming that a de-skewing filter with enough range is present in the transponder), the skew in an optical coherent transmitter may be reduced (or minimized) without needing to measure the skew itself.

Figure 2:
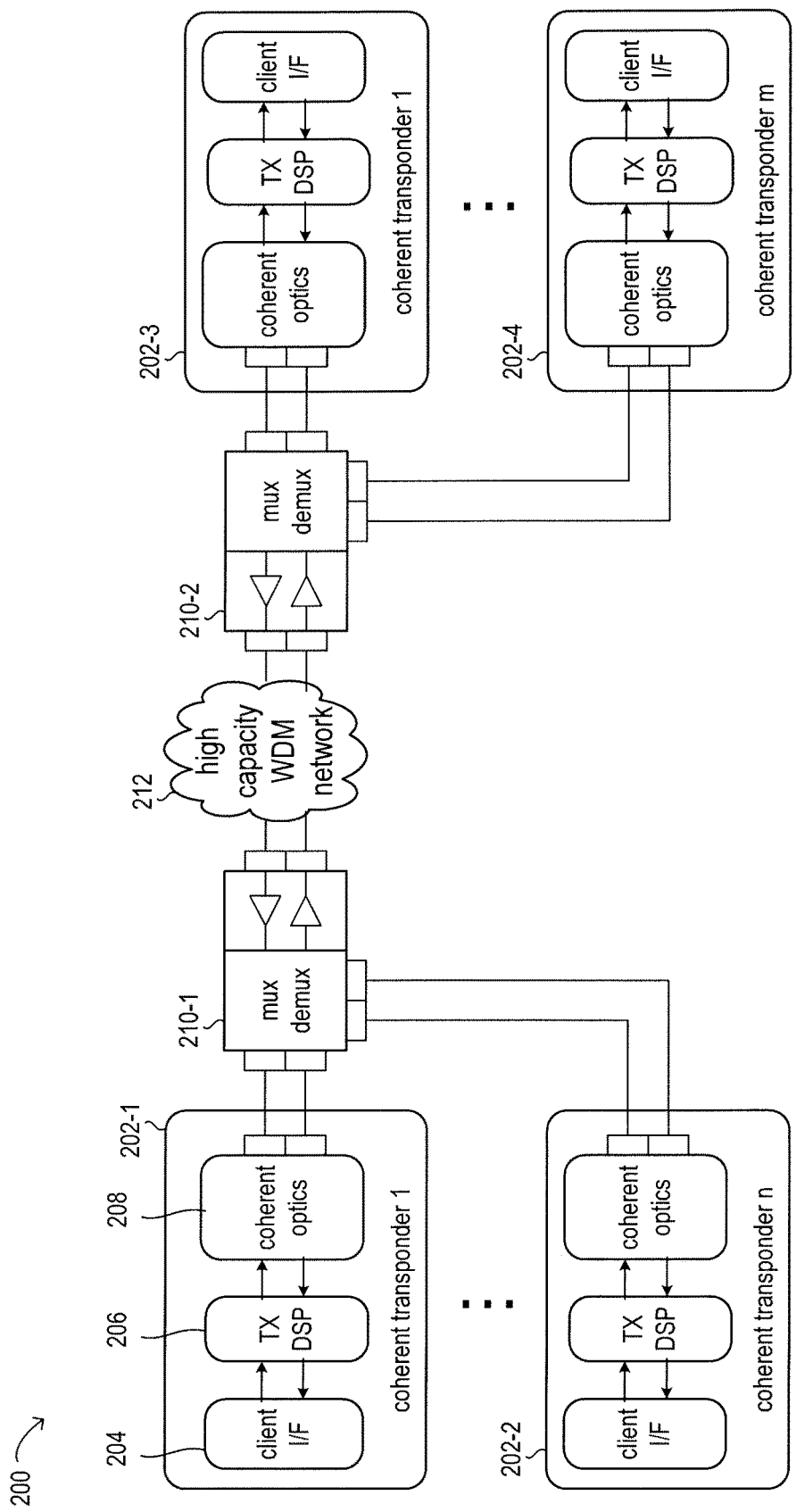
FIG. 2 is a block diagram of selected elements of a wavelength division multiplexing (WDM) system, according to at least some embodiments.

In some embodiments, an optical network (such as Optical network 101) may be implemented as a wavelength division multiplexing (WDM) system. In some such embodiments, the transmitters may include optical coherent transponders. In general, an optical coherent transponder is an optical transponder in which a fixed relation between the frequency and phase of the input and output signals is maintained or in which transmitted and received signals are in phase. FIG. 2 is a block diagram of selected elements of a WDM system 200, according to at least some embodiments. In this example embodiment, WDM system 200 includes multiple optical coherent transponders (shown as coherent transponders 202), including multiple optical coherent transponders 202 (labeled as coherent transponders 1-n and coherent transponders 1-m, respectively) on each side of a high capacity WDM network 212. In this example embodiment, each of these coherent transponders 202 may implement the functionality of an optical transmitter, such as one of the optical transmitters 102 illustrated in FIG. 1.

Figure 3:
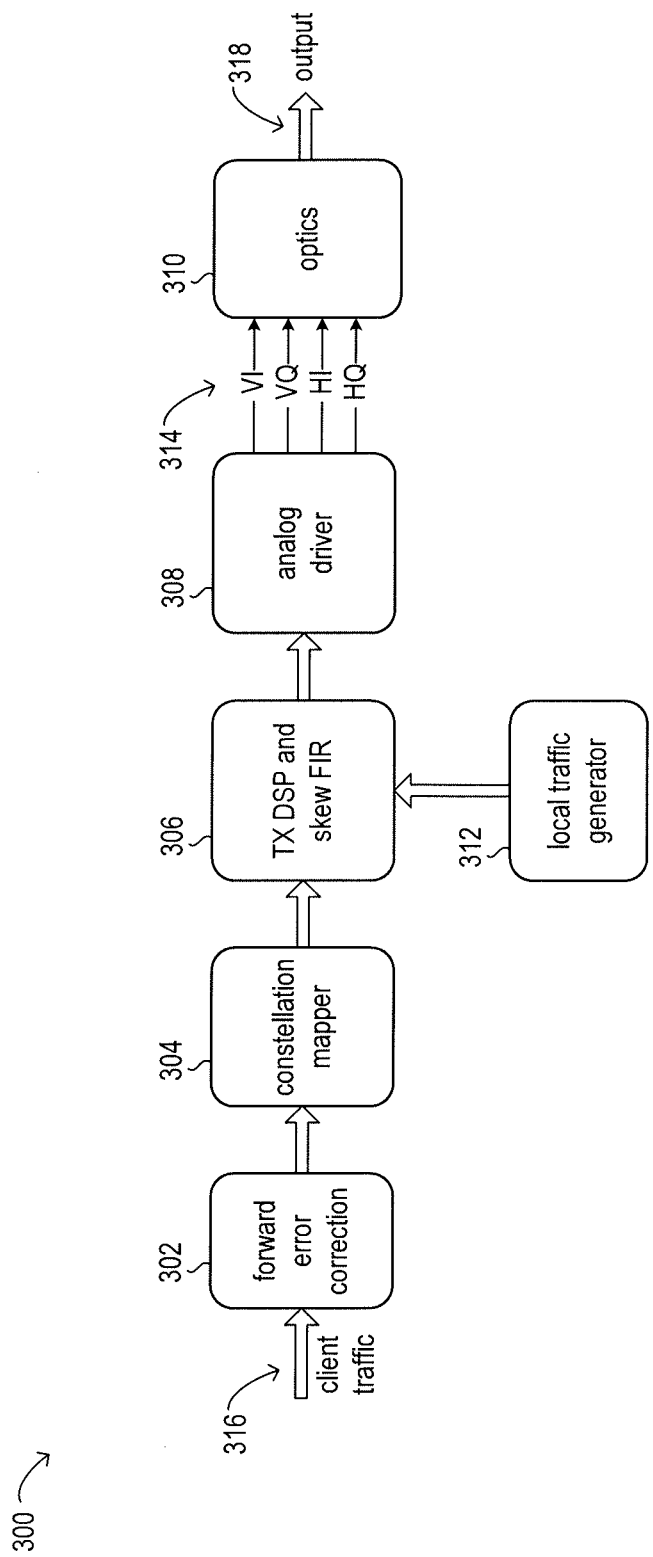
FIG. 3 is a block diagram of selected elements of a system for implementing an optical coherent transponder, according to at least some embodiments.

In this example embodiment, coherent transponder 202-1 includes a client interface 204 through which client traffic may be received (not shown). Coherent transponder 202-1 also includes a transmitter/DSP element 206, which may perform a variety of functions, including frequency equalization and pulse shaping. Coherent transponder 202-1 also includes a coherent optics element 208, which may include a laser, a splitter, and one or more modulators, in various embodiments. As illustrated this example embodiment, each of a plurality of other optical coherent transponders 202 (including coherent transponders 202-2, 202-3, and 202-4) may include substantially the same elements as those included in coherent transponder 202-1. A more detailed example of an optical coherent transponder and its components is illustrated in FIG. 3 and described below.

In this example embodiment, system 200 includes a multiplexer/demultiplexer (shown as a mux/demux element 210) on each side of the WDM network 212. In this example embodiment, each of these mux/demux elements 210 may implement the functionality of an optical multiplexer (such as multiplexer 104 illustrated in FIG. 1) and the functionality of an optical demultiplexer (such as demultiplexer 105 illustrated in FIG. 1). For example, mux/demux element 210-1 may be a system, apparatus or device to combine the signals transmitted by coherent transponders 202-1 and 202-2 (and any other coherent transponders 202 on the same side of WDM network 212) at respective individual wavelengths, into a WDM signal for transmission over WDM network 212.

A high-speed optical transmitter (such as one of the transmitters 102 illustrated in FIG. 1) may, in some embodiments, include an optical coherent transponder (such as one of the coherent transponders 202 illustrated in FIG. 2). FIG. 3 is a block diagram of selected elements of a system 300 for implementing an optical coherent transponder, according to at least some embodiments. In various embodiments, the coherent transponders 202 illustrated in FIG. 2 may include some or all of the elements of the optical coherent transponder system 300 illustrated in FIG. 3. In this example embodiment, optical coherent transponder system 300 may receive (as input) client traffic 316 and may produce an optical signal (shown as output 318) for transmission over an optical network. In some embodiments, the output signal 318 may be produced in an optical modulation format that is suitable for transmission in a wavelength division multiplexing system, such as WDM system 200 illustrated in FIG. 2.

In this example embodiment, the client traffic 316 coming into the transponder may include multiple digital or analog electrical signals containing information to be encoded onto an optical signal for transmission through phase and/or amplitude modulation, depending on the format. In some embodiments, the input may be a digital signal including a return-to-zero (RZ) or a non-return-to-zero (NRZ) encoding. These are encodings in which a value of "one" is represented by one significant condition (such as a positive voltage or a DC bias on the transmission line) while a value of "zero" is represented by some other significant condition (such as a negative voltage or the absence of bias), with or without an additional neutral or rest condition, respectively. In such embodiments, the client traffic 316 presented to the forward error correction element 302 and the constellation mapper 304 may be digital, but it may be converted to an analog signal to be modulated for transmission by subsequent elements within system 300.

In the example embodiment illustrated in FIG. 3, the forward error correction element 302 may include circuitry to correct transmission errors by adding redundancy to the messages it receives in the client traffic 316. The constellation mapper 304 may include circuitry to map a combination of bits at its input into multiple data signals that correspond to a specific symbol within the set of symbols that can be transmitted using a specific modulation format. In some embodiments, the constellation mapper may transform multiple input lines that carry on/off modulating signals (e.g., NRZ bits) into one complex multilevel modulation format (e.g., 16-QAM symbols) to be transmitted over two channels. For example, the constellation mapper may receive, in parallel, four bits for the H signal and four bits for the V signal. The constellation mapper may combine the four bits for the H signal into one symbol of the multilevel modulation format, and generate the corresponding HI and HQ signals. Similarly, the constellation mapper may combine the four bits for the V signal into one symbol of the multilevel modulation format, and generate the corresponding VI and VQ signals. The output of the constellation mapper may include the four signals HI, HQ, VI, and VQ.

In the example embodiment illustrated in FIG. 3, system 300 includes an alternate source of input for the signal to be modulated and transmitted by the optical coherent transponder, shown as local traffic generator 312. In some embodiments, local traffic generator 312 may include circuitry to generate input traffic (locally) representing a particular pattern. In other embodiments, local traffic generator 312 may be programmable to generate input traffic (locally) representing a specified pattern. For example, in a test mode or calibration mode, local traffic generator 312 may generate four signals, each representing a series that includes alternating values of zeros and ones (e.g., 01010101 . . . ), the four signals corresponding to HI, HQ, VI, and VQ. As in the client traffic case, the remaining elements of system 300 may transform these locally-generated signals for transmission over two channels. In at least some embodiments of the present disclosure, a de-skewing operation may be performed while in a test mode, and may include generating these types of signals.

In the example embodiment illustrated in FIG. 3, system 300 includes an element 306 comprising circuitry to perform the functions of a transmitter/DSP and a finite impulse response filter (more specifically, a skew FIR filter). In this example, element 306 may perform a variety of functions within the optical coherent transponder system 300, including, but not limited to, frequency equalization, pulse shaping, and/or deliberately introducing delays (skew) for each of the four signals HI, HQ, VI, and VQ independently. In this example, element 306 may receive the output of the constellation mapper 304 in order to transform client traffic 316 for transmission (e.g., during normal operation) or may receive the output of local traffic generator 312 (e.g., when operating in a test mode or calibration mode). The skew FIR shown within element 306 may be an electrical FIR including circuitry to introduce an additional amount of skew in the transponder. For example, in some embodiments, the skew FIR may be configurable or programmable to perform fine-tuning of the residual skew generated by the optical coherent transponder or to de-skew its output. In some embodiments, the amount of skew introduced by this filter (which may sometimes be referred to herein as a "de-skewing FIR filter", or simply a "de-skewing filter") may be modified to compensate for the initial skew in an optical coherent transponder. In some embodiments, the transponder may include a programmable register or a location in a non-volatile memory (e.g., an EPROM or EEPROM) whose value controls the amount of skew introduced by the de-skewing filter in the transponder. By modifying the value of this register/location, the performance of the transponder may be improved.

In the example embodiment illustrated in FIG. 3, an analog driver 308 may include circuitry to adjust the four signals HI, HQ, VI, and VQ to drive electro-optical components within optics 310 (e.g., Mach-Zehnder modulators). More specifically, analog driver 308 may perform the functionality of an amplifier that boosts the four signals HI, HQ, VI, and VQ to generate amplified signals, and may adapt the impedances between the amplified signals and such modulators. The output of analog driver 308, shown collectively in FIG. 3 as signals 314, may be analog signals having the voltages required by modulators within optics element 310 to generate a modulated optical signal, shown as output 318.

In various embodiments, optics element 310 may include one or more lasers, splitters, modulators, and/or other circuit elements (not shown). In some embodiments, the output 318 of optics element 310 may be a signal that is a combination (sum) of the H and V polarizations generated by modulating the four signals HI, HQ, VI, and VQ produced by the preceding elements of optical coherent transponder system 300, and each polarization may be a 16-QAM signal. In such embodiments, one 16-QAM signal may be modulated to carry the information from the HI and HQ signals, while the other 16-QAM signal may be modulated to carry the information from the from the VI and VQ signals. In some embodiments, the H and V polarizations may be generated in substantially the same manner, except that the V polarization may then be rotated by 90 degrees. In some embodiments of the present disclosure, the skew compensation techniques described herein may be applied to reduce the I/Q skew for one channel (polarization) at a time. In such embodiments, the channel (polarization) that is not the target of the skew compensation operation may be disabled or turned off during the skew compensation operation.

All of the components of system 300 illustrated in FIG. 3 may be considered part of the transponder (on the transmission side), at least in some embodiments. In other embodiments, the functionality of these components may be divided up differently among the components of an optical network or within an optical coherent transponder.

As noted above, some existing methods for measuring in-phase/quadrature skew rely on the use of an Optical Modulation Analyzer (OMA) to take the measurements. These instruments, though very expensive, have limited accuracy when measuring the skew for optical signals in advanced (complex) modulation formats. For example, the measurement resolution for an OMA is typically on the order of ±1 ps. Thus, any adjustment of the skew that is less than 1 ps is not likely be detected by the OMA. However, for certain classes of optical coherent transponders, the maximum acceptable combined transmission (TX) and reception (RX) skew over their usable life is on the order of 3 ps, and the transponder may not be error-free outside of this range. In general, any skew error may result in a transmission penalty that reduces the maximum error-free distance supported by the transponder, and the larger the skew error, the larger the penalty would be. Rather than relying on skew measurements made by an OMA, the systems and methods described herein may perform de-skewing operations using less expensive equipment and without having to measure the actual skew in an optical coherent transponder under test. As described in more detail herein, these methods may be used to find the optimal amount of skew to be introduced by the de-skewing filter of the transponder (the skew amount that results in the best performance). In coherent transponders that employ a dual-polarization format (such as a format that includes a horizontal polarization H and a vertical polarization V), the methods described herein may be used to find the optimal amount of skew to be introduced by the de-skewing filter for either one of the two polarizations. As noted above, these methods may not be affected by background noise, jitter, power instability (such as amplitude instability), or pulse shape. In at least some embodiments, the de-skewing techniques described herein may not suffer from "one symbol uncertainty", but may be robust against two symbols. In such embodiments, as long as the initial skew does not exceed a threshold delay value equivalent to one symbol (according to the modulation format), the direction of compensation may be clear.

In some embodiments, to perfectly de-skew an optical coherent transponder, a skew amount representing a one-half symbol delay may be added to or subtracted from the total skew. For example, in some embodiments, a de-skewing filter (such as the skew FIR filter included in element 306 of the optical coherent transponder system 300 illustrated in FIG. 3) may, during skew compensation, be able to compensate for skews of up to one-half symbol in order to optimize the transmission performance of the transponder. The systems and methods described herein for performing skew compensation may be dependent on an analysis of the optical power of first harmonics of a simulated sinusoidal wave (or a combination of sinusoidal signals) transmitted by the transponder and determining the optimal skew to be introduced by the de-skewing filter based on the measured optical power of the first harmonics.

To demonstrate the relationship of the skew between the electrical path of a specific optical coherent transponder and the optical path of the transponder for a given optical signal and the corresponding optical power of the first harmonics of the signal, a local traffic generator of the transponder may be set to generate an input signal representing a series that includes alternating values of zeros and ones (e.g., 01010101, and so on) on both the in-phase and quadrature components of one of the channels (polarizations). In this example, the transponder would be set to generate these signals in phase. This input pattern represents a modulating electrical signal that is essentially a sinusoid, with most of the spectral content generated in the first harmonic. Therefore, the optical signal of each of the components I and Q, is phase-modulated by sinusoid. In this specific transponder, the symbol time is on the order of 32 ps. Therefore, the first harmonic is expected to be at about ±16 GHz from the carrier. In this example, the optical power of the first harmonic of the output is measured on both the positive and negative side of the spectrum (with respect to the carrier frequency) by an Optical Spectrum Analyzer (OSA). Measurements have shown that, under this condition, a small variation in the skew causes a significant change in the power of the first harmonic. Measurements have also shown that, relative to the carrier, the effect of the skew on the power of the first harmonic on the lower frequency side and on the higher frequency side have opposite behavior.

Figure 4:
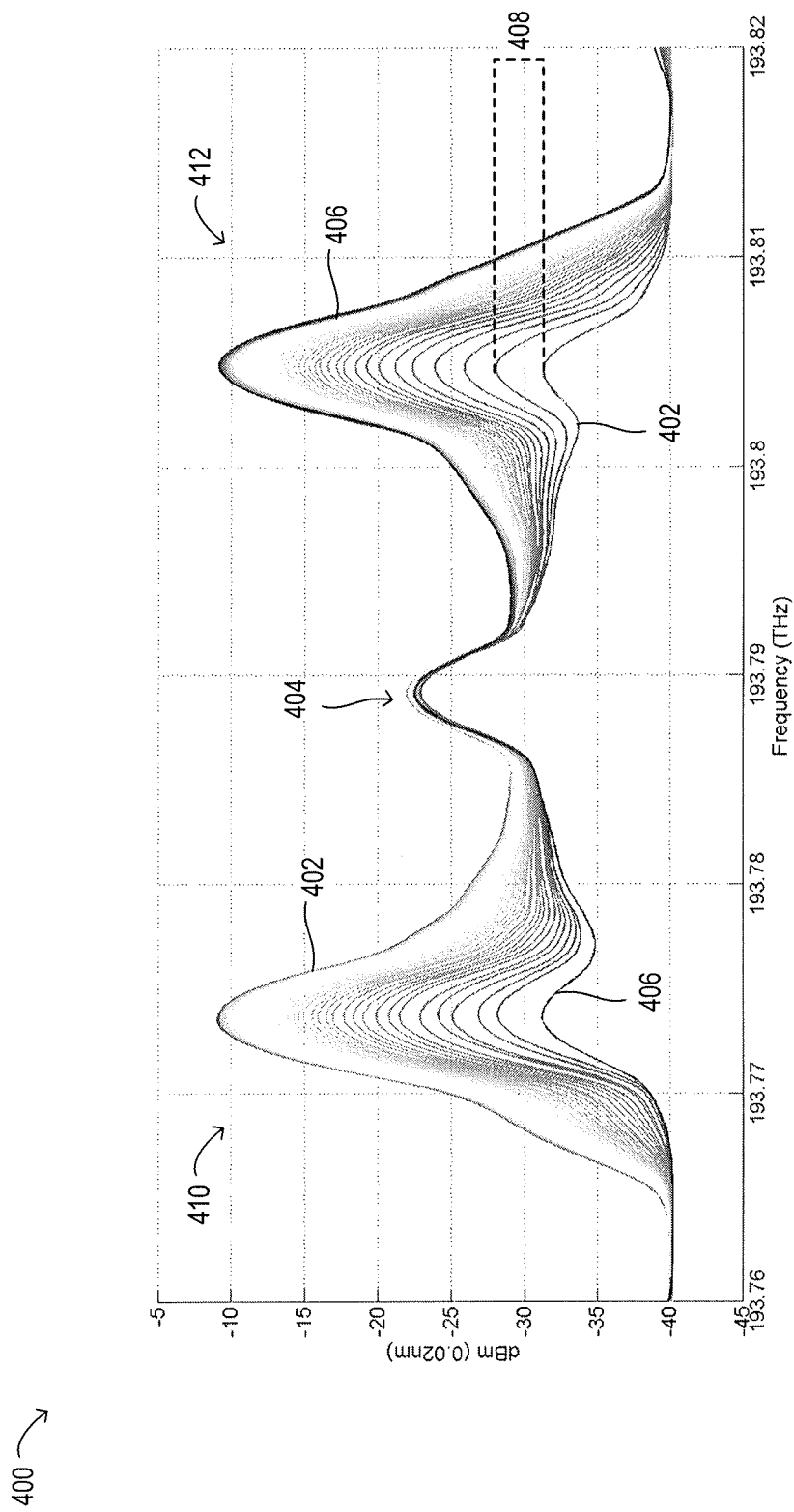
FIG. 4 illustrates example optical spectra when different amounts of skew are introduced by an optical coherent transponder, according to at least one embodiment.

FIG. 4 illustrates example optical spectra when different amounts of skew are introduced by the optical coherent transponder described above (one in which the symbol time is on the order of 32 ps). More specifically, graph 400 illustrates a collection of curves, each of which represents the optical power (measured in decibels referenced to one milliwatt) over the frequency spectrum for the first harmonic of an optical signal having a different amount of skew. In graph 400, each curve depicts the spectra measured by the spectrum analyzer for an optical signal transmitted by an optical coherent transponder in response to receiving an input signal representing a series that includes alternating values of zeros and ones (01010101, and so on) in each of the I and Q components and having a different (known) amount of skew. These curves are overlaid in the graph to represent different outputs of the spectrum analyzer when the input optical signal has different amounts of skew. In this example, the carrier signal (at frequency $f_c$) is shown at 404, and the left side of graph 400 (shown as 410) depicts the power of the first harmonic on the lower frequency side ($f_c-f_o$) with respect to the carrier signal. Conversely, the right side of graph 400 (shown as 412) depicts the power of the first harmonic on the higher frequency side ($f_c+f_o$) with respect to the carrier signal (at frequency $f_c$).

As noted above, relative to the carrier, the power of the first harmonic on the lower frequency side and on the higher frequency side have opposite behavior. For example, one of the upper-most curves (curves depicting the highest optical power) on the lower frequency side of the carrier frequency at 404 (e.g., curve 402) becomes one of the lower-most curves (curves depicting the lowest optical power) on the higher frequency side of the carrier frequency at 404. Conversely, one of the lower-most curves on the lower frequency side of the carrier frequency at 404 (e.g., curve 406) becomes one of the upper-most curves on the higher frequency side of the carrier frequency at 404.

In this example, on the right side of graph 400 (shown as 412), for each successive curve going from bottom-to-top (e.g., beginning with curve 402 and moving toward curve 406), the amount of skew increases by 0.5 ps. On the left side of graph 400 (shown as 410), for each successive curve going from top-to-bottom (again beginning with curve 402 and moving toward curve 406), the amount of skew increases by 0.5 ps. As illustrated in this example, the change in the optical power of the first harmonic relative to the change in the amount of skew may vary over the frequency spectrum. In this example, the change in the optical power for each 0.5 ps increase in the skew is greater for the curves with the smaller amounts of skew on the right side of the graph (relative to the carrier frequency) than on the left side of the graph. Thus, the portion of the graph labeled as 412 may be considered the high-resolution range for these curves. Conversely, the change in the optical power for each 0.5 ps increase in the skew is greater for the curves with the larger amounts of skew on the left side of the graph (relative to the carrier frequency) than on the right side of the graph. Thus, the portion of the graph labeled as 410 may be considered the high-resolution range for these curves. In this example, in both cases, the high-resolution range includes optical power values between −35 dBm to −20 dBm. As illustrated this example, a relatively small change in the amount of skew can result in a relatively large change in the power of the first harmonic. For example, a 0.5 ps skew change can result in up to a 4 dBm power change in the high-resolution range. This is illustrated in FIG. 4 by the difference (labeled 408) between the lowest two curves on the right hand side of graph 400.

In at least some embodiments of the present disclosure, by measuring the optical power of the first harmonics of an optical signal in a complex modulation format that is transmitted by an optical coherent transponder while varying the amount of skew introduced by a de-skewing filter in the transponder, the optimal amount of skew to be introduced by the de-skewing filter (an amount that compensates for the I/Q skew in the transponder) may be identified without the need to measure the skew itself. In some embodiments, the optical power measurements may be taken using a system (e.g., a test system) that includes an OSA. In other embodiments, the optical power measurements may be taken using a system (e.g., a test system) that includes one or more filters and an optical power meter. In at least some embodiments, the de-skewing methods described herein may be more accurate and less expensive to perform than existing de-skewing methods. These de-skewing methods may not be dependent on calibration data. In addition, they may not depend on the receiver and DSP to reconcile the signal, as would be the case with de-skewing techniques that rely on skew measurements taken using an OMA.

In at least some embodiments, a de-skewing operation for a given optical coherent transponder may include configuring a local traffic generator of the transponder to generate an input signal representing a series that includes alternating values of zeros and ones (e.g., 01010101, and so on) on both the in-phase and quadrature components of one of the channels (polarizations), with the transponder set to generate these signals in phase. As noted above, this input pattern represents a modulating electrical signal that is essentially a sinusoid, with most of the spectral content generated in the first harmonic. Since the de-skewing operation is robust against two symbols, unless the initial skew is greater than a one symbol delay, the skew itself need not be measured. In at least some embodiments, the de-skewing operation may include repeatedly changing the amount of skew introduced by the de-skewing filter by a fixed increment and measuring the optical power of the first harmonics (($f_c-f_0$) and ($f_c+f_0$)) of the resulting output signal for each different amount of skew. In some embodiments, one or more passive optical filters may be used to isolate the positive and negative first harmonics of the output signal transmitted by the transponder, and the filtered output may be input to an optical power meter.

In some embodiments, the amount by which the amount of skew introduced by the de-skewing filter is changed may be dependent on the resolution with which the amount of skew can be changed. For example, the amount by which the amount of skew introduced by the de-skewing filter is changed may be the smallest amount by which the skew can be changed. In some embodiments, the method may include scanning the entire range of values for the amount of skew that can be introduced (through addition or subtraction) by the de-skewing filter. In some embodiments, the method may include scanning a range of values for the amount of skew that can be introduced by the de-skewing filter that corresponds to a two-symbol delay.

Figure 5:
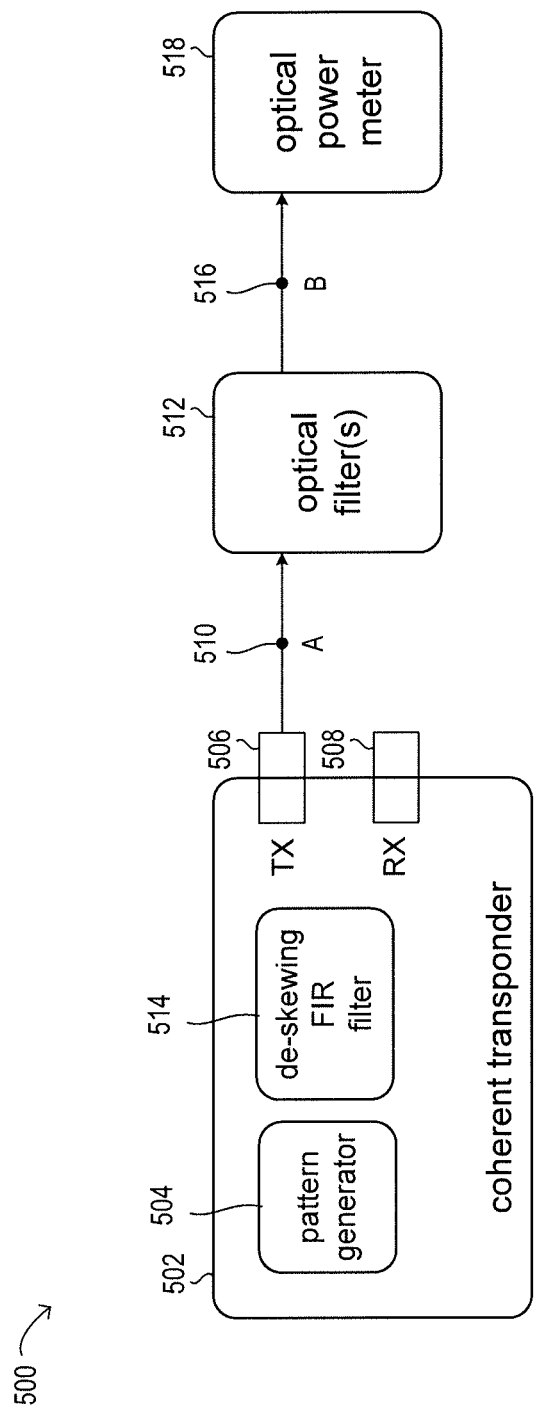
FIG. 5 is a block diagram of selected elements of a system for reducing the In-phase/Quadrature (I/Q) skew of signals in optical coherent modulation formats that are transmitted by an optical coherent transponder, according to at least some embodiments.

FIG. 5 is a block diagram of selected elements of a system 500 for reducing the In-phase/Quadrature (I/Q) skew of signals in optical coherent modulation formats that are transmitted by an optical coherent transponder, according to at least some embodiments. In at least some embodiments, system 500 may be used to de-skew a coherent transponder. In the example embodiment illustrated in FIG. 5, system 500 includes an optical power meter 518, one or more passive optical filters 512, and a coherent transponder under test (shown as coherent transponder 502). In this example, coherent transponder 502 includes a pattern generator 504, de-skewing FIR filter 514, a transmitter 506, and a receiver 508. In at least some embodiments, system 500 may be used to determine the optimal skew amount to be introduced by de-skewing FIR filter 514 to compensate for the initial skew of coherent transponder 502.

In this example embodiment, coherent transponder 502 may produce an optical signal in response to a digital signal generated (locally) by pattern generator 504. In some embodiments, the pattern generator 504 of coherent transponder 502 may be set to generate a signal representing a series that includes alternating values of zeros and ones on both the I and Q components, where all patterns are in phase. In other embodiments, other input patterns may be used. In this example, de-skewing FIR filter 514 may introduce some amount of skew into the optical signal that was generated by coherent transponder 502 in response to the locally generated input, and the output of de-skewing FIR filter 514 may be modulated by an optics component (such as optics element 300 illustrated in FIG. 3) before being provided to transmitter 506. In this example, the output of transmitter 506, as seen at point A (510), is provided to one or more passive optical filters 512. Optical filters 512 may isolate the positive and/or negative first harmonics of the output of transmitter 506. In this example, the output of optical filters 512, as seen at point B (516) may be provided to optical power meter 518, which may be used to measure the optical power of the first harmonic(s) of the output of transmitter 506.

In order to determine the optimal skew amount to be introduced by de-skewing FIR filter 514 to compensate for the initial skew of coherent transponder 502, respective measurements of the optical power of the first harmonic(s) of the output of transmitter 506 may be taken while the amount of skew introduced by de-skewing FIR filter 514 is changed. For example, a configurable parameter or component of de-skewing FIR filter 514 may be modified repeatedly to increment and/or decrement the amount of skew introduced by de-skewing FIR filter 514 by a small fixed amount. The amount of skew introduced by de-skewing FIR filter 514 may be incremented and/or decremented (and corresponding power measurements may be taken) enough times to include all possible skew amounts in a range that is two symbols wide. In at least some embodiments, optical power meter 518 may include logic and/or circuitry to store the power measurements taken for each different skew amount for subsequent analysis. In at least some embodiments, the optimal skew amount to be introduced by de-skewing FIR filter 514 to compensate for the initial skew of coherent transponder 502 may be determined based, in part, on these power measurements. For example, the power measurements may be analyzed to identify the minimum optical power value that was obtained from all of the measurements, and the amount of skew that was introduced by the de-skewing filter when the minimum optical power value was obtained may be determined. The optimal skew amount to be introduced by de-skewing FIR filter 514 may then be calculated as the amount of skew that was introduced by the de-skewing filter when the minimum optical power value was obtained, offset by a one-symbol delay. In some embodiments, the direction of the offset (whether it is added to or subtracted from the amount of skew that was introduced by the de-skewing filter when the minimum optical power value was obtained) may be dependent on whether the minimum optical power value was obtained for a measurement taken on the positive first harmonic or the negative first harmonic of the optical signal output by transmitter 506.

In some embodiments, system 500 may include logic and/or circuitry to determine (e.g., automatically) optimal skew amount to be introduced by de-skewing FIR filter 514, based on the measurements of the optical power of the first harmonic of the signal transmitted by transmitter 506, and on the corresponding amounts of skew introduced by de-skewing FIR filter 514 when the measurements were taken. In some embodiments, this skew compensation logic/circuitry may be included in optical power meter 518 (not shown). In other embodiments, this skew detection logic/circuitry may be included, along with optical power meter 518 and one or more optical filters 512, in a test system that is used to de-skew optical coherent transponders during design, during manufacturing, and/or during production use to ensure that the optical coherent transponders operate within acceptable limits.

In some embodiments, the skew detection logic/circuitry may include one or more programmable elements for which various parameters may be changed through the execution of test software or production software. For example, in some embodiments, a test system may implement an application programming interface that allows a user to specify a pattern to be generated by pattern generator 504, to select pattern generator 504 (as opposed to client traffic) as the source of the signal to be modulated and transmitted by transponder 502, and/or to specify a parameter of de-skewing FIR filter 514 within transponder 502 that controls the amount of skew that is deliberately and explicitly introduced by de-skewing FIR filter 514 in order to de-skew the signal transmitted by transponder 502. In such embodiments, program instructions may be executed by a processor in the test system (or in a computer that drives the test system) to cause the programmable elements to be configured in particular ways while in a test mode and/or while in a production mode or in normal operation. For example, in some embodiments, the test system (which may be a test bench or piece of test equipment) may include (in addition to an optical power meter, one or more optical filters, and/or skew detection logic/circuitry) a command interface and a display (for displaying optical power measurements and/or corresponding skew amounts). The test system may be communicatively coupled to a processor or computer that provides commands to the optical power meter and/or to skew detection logic/circuitry and receives output (e.g., optical power measurements and/or skew values) from the optical power meter and/or skew detection logic/circuitry, respectively. In some embodiments, program instructions may be executed by the processor or computer to analyze the power measurement values, to identify the minimum power value, to determine the amount of skew that was introduced by the de-skewing filter when the minimum power value was obtained, and to calculate the optimal skew amount to be introduced by de-skewing filter by adding a one-half symbol delay to or subtracting a one-half symbol delay from the determined skew amount. In some embodiments, program instructions may be executed by the processor or computer to cause the amount of skew to be introduced by de-skewing filter to be set to the optimal amount and/or to return or display the optimal skew to be introduced by de-skewing filter.

Figure 6:
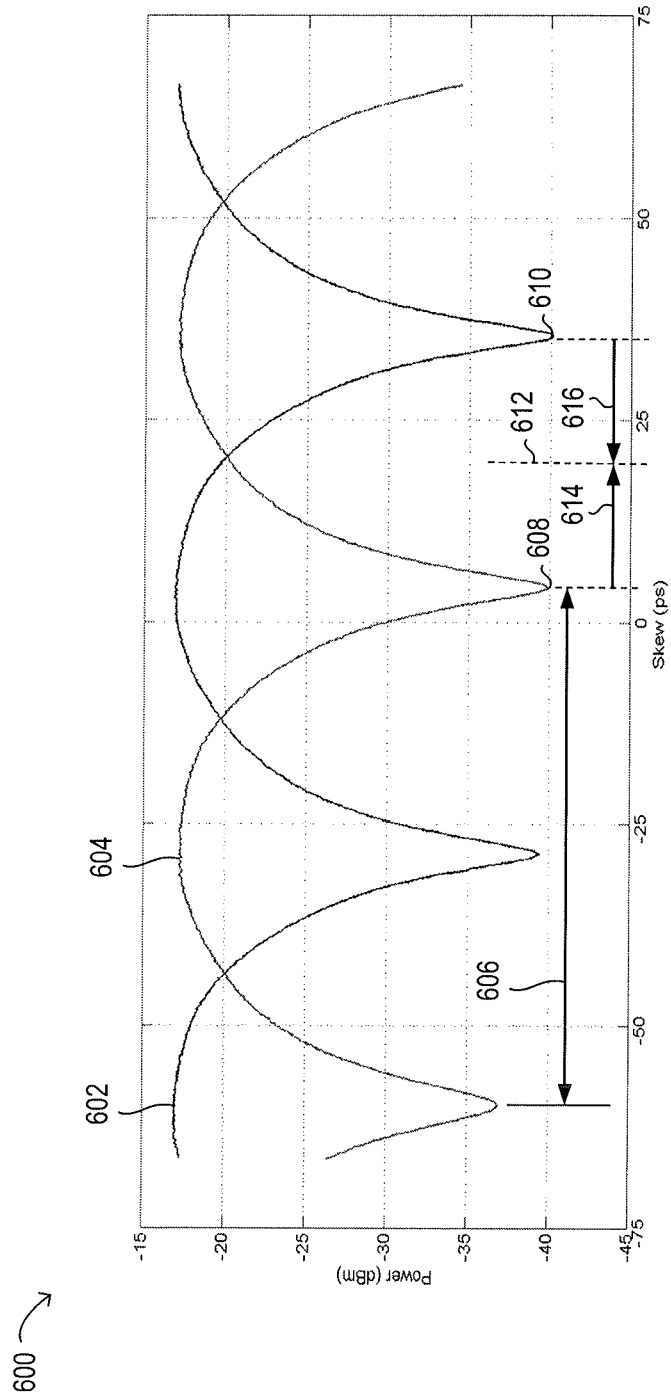
FIG. 6 illustrates an example of the relationship between the measured optical power of the first harmonics of an optical signal and the amount of additional skew that is introduced by a de-skewing FIR filter, according to at least some embodiments.

FIG. 6 illustrates an example of the relationship between the measured optical power of the first harmonics of an optical signal and the amount of additional skew that is introduced by a de-skewing FIR filter, according to at least some embodiments. More specifically, each of the two curves in graph 600 illustrates the optical power of one of the first harmonics (measured in decibels referenced to one milliwatt) over a range of skew values (in ps), each representing an amount of skew introduced by the de-skewing FIR filter for a respective one of the power measurements. In this example, each point on curve 604 maps the optical power of the positive first harmonic ($f_c-f_0$) to a corresponding amount of skew introduced by the de-skewing FIR filter. Similarly, each point on curve 602 maps the optical power of the negative first harmonic ($f_c-f_0$) to a corresponding amount of skew introduced by the de-skewing FIR filter.

In this example, the total skew in the system (which may include an electrical skew component, an optical skew component, and an amount of skew introduced by the de-skewing FIR filter) may be unknown. However, the point at which the measured optical power of the first harmonic is the minimum measured value is the point at which the relative phase of the in-phase and quadrature components is 0 or $\pi$. In other words, at this point, the in-phase and quadrature components are completely out of phase, and the I/Q skew error is at its maximum value. In this example, since the periodicity of both curves is $2\pi$ (a combination of sinusoids) or two symbols, the relative phase of the in-phase and quadrature components of an optical signal transmitted by a perfectly de-skewed transponder would be equal to $\pi/2$. Therefore, compensating for the skew at the point at which the power is a minimum would require an offset from the skew amount at that point of a one-half symbol delay in the appropriate direction. As described above, in-phase/quadrature skew can cause power variation in the harmonics that have opposite behavior. For example, if, for a given amount of skew, the power at ($f_c+f_0$) is at a minimum, then the power at ($f_c-f_0$) is at a maximum, and vice-versa. Therefore, if the minimum power measurement is taken on the positive harmonic, a one-half symbol delay may be added to the corresponding skew amount. On the other hand, it the minimum power measurement is taken on the negative harmonic, a one-half symbol delay may be subtracted from the corresponding skew amount.

In the example illustrated in FIG. 6, the symbol time is on the order of 32 ps. Therefore, the periodicity of each curve is on the order of 64 ps (two symbols). In this example, the minimum power measured for the positive harmonic (on curve 604) is labeled at 608, and corresponds to the introduction of approximately 4 ps of skew by the de-skewing FIR filter. The minimum power measured for the negative harmonic (on curve 602) is labeled as 610, and corresponds to the introduction of approximately 36 ps of skew by the de-skewing FIR filter. In this example, the optimal amount of skew to be introduced by the de-skewing FIR filter may be calculated as the amount of skew at 608 (4 ps) plus one-half symbol (16 ps). Alternatively, the optimal amount of skew to be introduced by the de-skewing FIR filter may be calculated as the amount of skew at 610 (36 ps) minus one-half symbol (16 ps). Either of these calculations yields an optimal amount of skew to be introduced by the de-skewing FIR filter of 20 ps shown at 612. In some embodiments, to improve the accuracy of the results, the average value of these calculations may be used as the optimal amount of skew.

In at least some embodiments, the de-skewing techniques described herein may depend only on the optical power of the two first harmonics and on the skew that is being introduced by the de-skewing filter during each measurement of the power, and may not be affected by background noise, jitter, power instability (such as amplitude instability), or pulse shape. For example, since the optical power meter measures the average power, any jitter may be averaged out. In another example, amplitude fluctuations may not affect the de-skewing technique as long as the point at which the optical power is the minimum is correctly identified (regardless of its actual value). For similar reasons, the de-skewing technique may not be affected by background noise (or floor noise) or power meter calibration, as long as the point of minimum optical power can be determined. In some embodiments in which the test system includes an optical power meter that is more sensitive to power fluctuations than an OMA or OSA, the accuracy of this de-skewing technique may be on the order of up to 2 fs. As previously noted, as long as the transponder introduces less than ±one symbol skew, there may not be any "symbol uncertainty". For example, the power minimum of the high frequency curve will be the one closer to the abscissa that is equal to 0 (where the skew introduced by the FIR filter equals 0).

Figure 7:
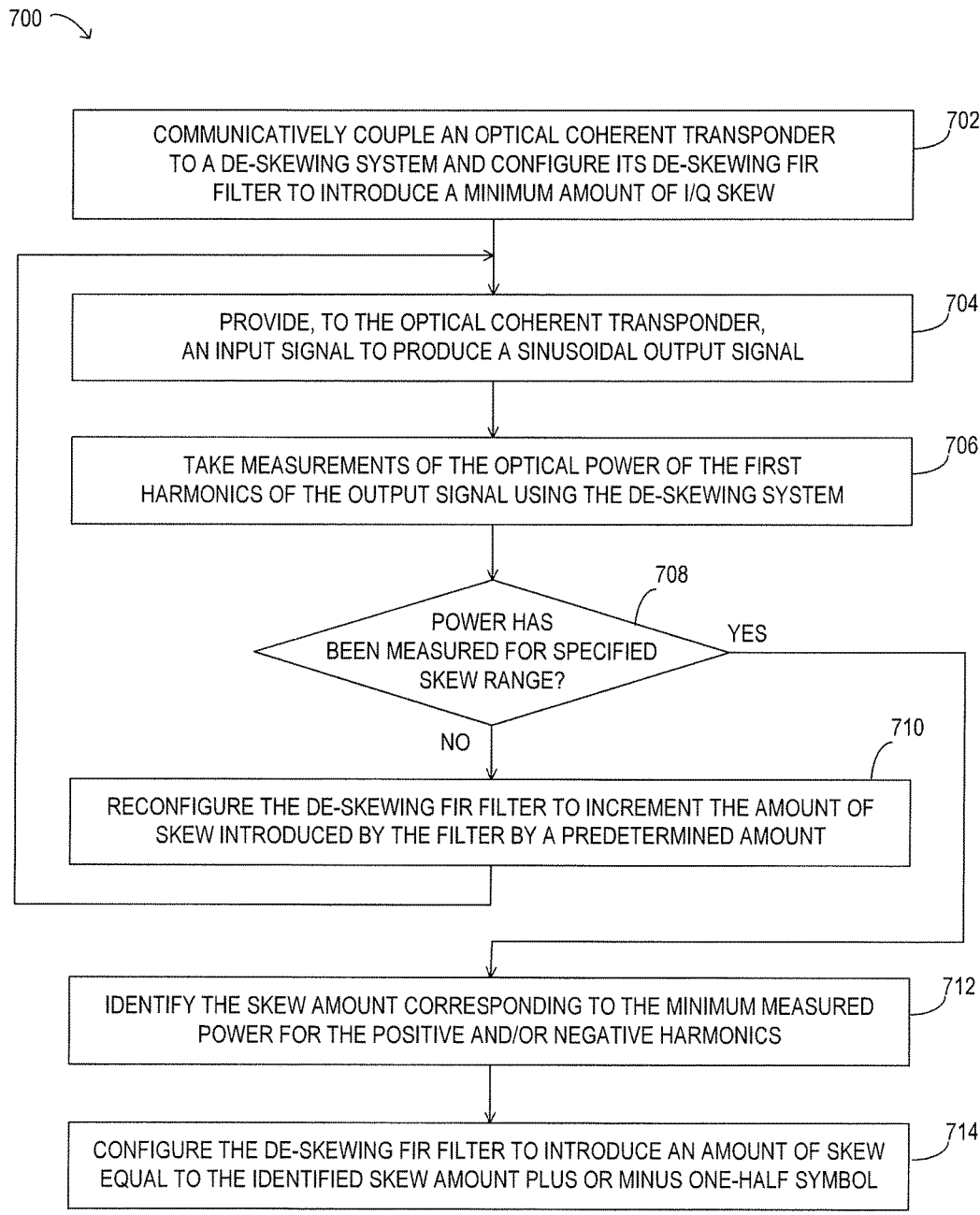
FIG. 7 is a flow diagram illustrating selected elements of a method for reducing the skew error between the electrical path of a transponder and the optical path of the transponder, according to at least some embodiments.

FIG. 7 is a flow diagram illustrating selected elements of a method 700 for reducing (or minimizing) the in-phase/quadrature skew error between the electrical path of an optical coherent transponder and the optical path of the transponder, according to at least some embodiments. As illustrated at step 702, in this example embodiment, the method may include communicatively coupling an optical coherent transponder to a de-skewing system and configuring a de-skewing FIR filter in the transponder to introduce a minimum amount of I/Q skew. In some embodiments, the de-skewing system may include one or more optical filters, an optical power meter, and/or and circuitry or logic to perform a de-skewing operation, as described herein. The de-skewing system may include, or be a component of, a test bench, or a piece of test equipment that can be used to reduce the skew between the electrical path of a transponder and the optical path of the transponder, as described herein.

The method may also include (at 704) providing, to the optical coherent transponder, an input signal to produce a periodic output signal that is generally sinusoidal (or is a combination of generally sinusoidal signals). For example, a local traffic generator of the transponder may be set to generate an input signal representing a series that includes alternating values of zeros and ones (e.g., 01010101, and so on) on both the in-phase and quadrature components of one of the channels (polarizations).

As illustrated in this example, the method may include (at 706) taking measurements of the optical power of the first harmonics of the output signal using the de-skewing system. In various embodiments, this may include, for example, taking a measurement of the optical power of the positive harmonic ($f_c-f_0$) and/or the negative harmonic ($f_c+f_0$). If (at 708), the optical power has not yet been measured for all of the possible amounts of skew that can be introduced by the de-skewing FIR filter in a specified skew range of interest, the power measurements may not be complete for this de-skewing operation. In this case, the method may include (at 710) reconfiguring the de-skewing FIR filter to increment the amount of skew introduced by the de-skewing FIR filter by a predetermined amount. For example, the de-skewing FIR filter may be configurable (e.g., physically, manually) or programmable to change the amount of skew that it introduces into the optical signal. In various embodiments, changing the amount of skew introduced by the de-skewing FIR filter may or may not include de-coupling the transponder from the test system and then re-coupling it to the test system (not shown). After reconfiguring the de-skewing FIR filter, the method may include repeating the operations shown in elements 704 and 706 one or more times to obtain measurements of the optical power of the first harmonics of the output signal while different amounts of skew are introduced by the de-skewing FIR filter. For example in some embodiments, power measurements may be taken for skew amounts in a range that is two symbols wide, beginning with the least possible amount of skew that can be introduced by the de-skewing filter and incrementing the amount of skew by a small fixed increment for each successive measurement.

If, or once (at 708), the power has been measured for all of the possible amounts of skew that can be introduced by the de-skewing FIR filter in the skew range of interest, the method may include (at 712) identifying the amount of skew that was introduced by the de-skewing FIR filter when the minimum power for the positive and/or negative harmonics were measured. The method may also include (at 714) configuring or programming the de-skewing FIR filter to introduce an amount of skew equal to the identified amount of skew plus or minus an amount of skew that is equal to a one-half symbol delay, as described above.

In some embodiments, the test systems and methods described herein may be used during manufacturing of an optical coherent transponder to more accurately compensate for the I/Q skew in optical signals transmitted by the transponder than is possible using existing skew compensation methods. In other embodiments, these methods may be used during prototyping to determine if the amount of I/Q skew in the optical signals transmitted by an optical coherent transponder that is built according to a particular design specification can be compensated for when the transponder goes into production. For example, if the de-skewing FIR filter does not have enough range to be able to compensate for the initial skew in an optical coherent transponder, as designed, the design specification may be modified and a modified prototype may be built and tested. This process may be repeated until the I/Q skew in the optical signals transmitted by one of the prototypes can be compensated for using the techniques described herein. In general, the test systems and methods described herein may be used at any time to perform a more accurate de-skewing operation for an optical coherent transponder than is possible using existing skew compensation methods, and using less expensive equipment than existing skew measurement methods.

Figure 8:
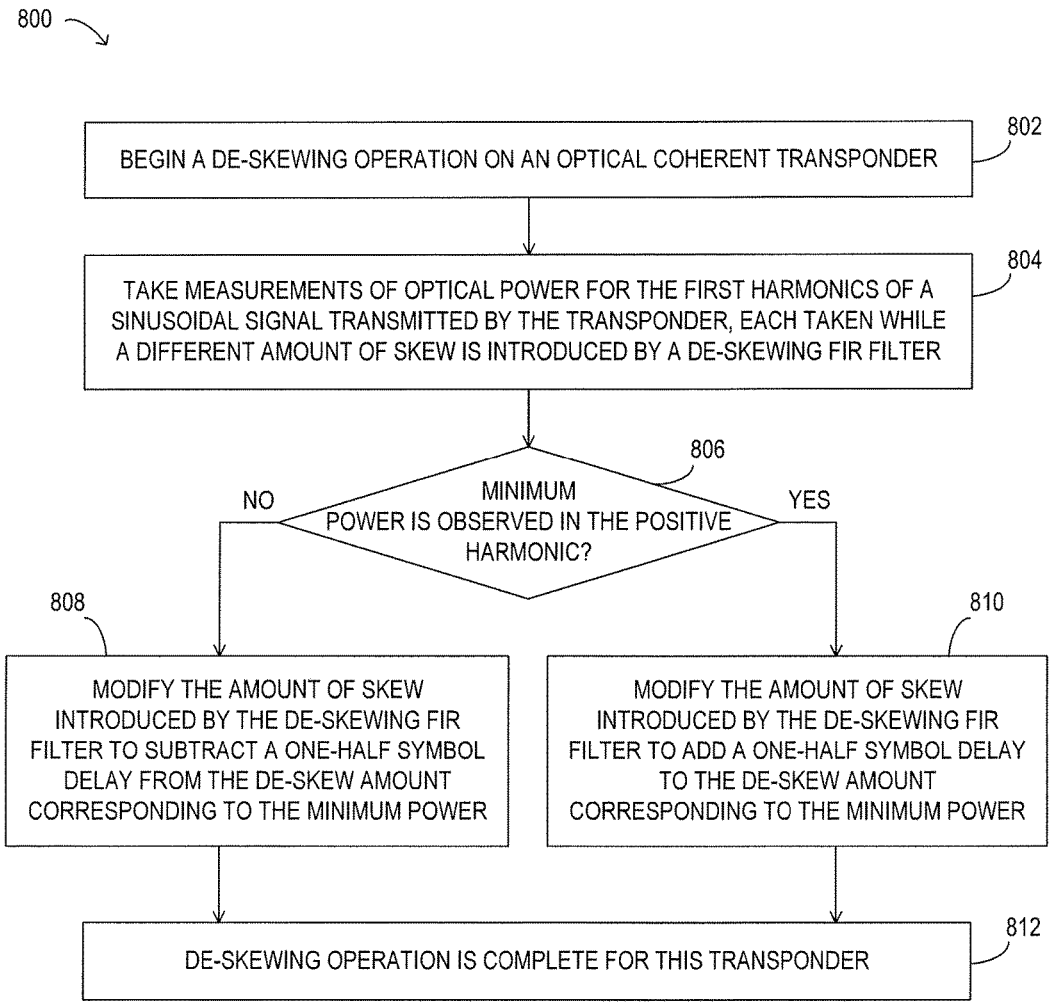
FIG. 8 is a flow diagram illustrating selected elements of a method for de-skewing an optical coherent transponder, according to at least some embodiments.

FIG. 8 is a flow diagram illustrating selected elements of a method 800 for de-skewing an optical coherent transponder, according to at least some embodiments. In this example embodiment, the method includes (at 802) beginning a de-skewing operation on an optical coherent transponder. In some embodiments, this may include communicatively coupling the transponder to a test system to determine the optimal amount of skew to be introduced by a de-skewing FIR filter to compensate for the I/Q skew in the transponder. In various embodiments, the test system may include an optical power meter, one or more optical filters, a skew compensator (such as those described herein), a processor or computer to execute program instructions, and/or other components. The method may include (at 804) taking measurements of the optical power for the first harmonics of a sinusoidal signal (or a combination of sinusoidal signals) transmitted by the optical coherent transponder, each of which is taken while a different amount of skew is being introduced by a de-skewing FIR filter in the optical coherent transponder. In various embodiments, this may include, for example, taking a measurement of the optical power of the positive harmonic and/or the negative harmonic, as described herein.

As illustrated in this example, if (at 806) it is determined that the minimum measured power is observed in the positive harmonic, then (at 810), the method may include modifying the amount of skew introduced by the de-skewing FIR filter to add a one-half symbol delay to the de-skewing amount that was introduced by the de-skewing FIR filter when the minimum power was measured. On the other hand, if (at 806) it is determined that the minimum measured power is not observed in the positive harmonic, but is observed in the negative harmonic, then (at 810), the method may include modifying the amount of skew introduced by the de-skewing FIR filter to subtract a one-half symbol delay from the de-skewing amount that was introduced by the de-skewing FIR filter when the minimum power was measured. In either case (at 812), the de-skewing operation may be complete for this transponder following the modification of the amount of skew introduced by the de-skewing FIR filter.

As described herein, in some embodiments of the present disclosure, an optical method may be used to reduce the combined optical-electrical I/Q skew for optical signals generated at the transmitter of an optical coherent transponder that is more accurate than existing skew compensation methods and that requires much less expensive equipment than existing skew compensation methods. In at least some embodiments, the method may include repeatedly measuring the optical power of a first harmonic of a signal in a complex modulated format that is transmitted by an optical coherent transponder that is under test while the amount of skew introduced by a de-skewing FIR filter in the transponder varies. The de-skewing operation may be performed in a test system that includes an optical power meter, one or more optical filters, and skew compensation logic/circuitry.

The optical power measurements may be analyzed to identify the minimum optical power measurement, and to determine the amount of skew that was introduced by the de-skewing FIR filter in the transponder when the minimum optical power measurement was taken. In embodiments in which the de-skewing FIR filter has enough range to be able to compensate for the residual skew in an optical coherent transponder, there may be no need to measure the actual skew in the system when performing a de-skewing operation.

The de-skewing techniques described herein may be robust against two symbols (for up to one symbol of delay), rather than against one symbol (one-half symbol of delay) as is the case with some existing skew compensation techniques. In addition, the de-skewing techniques described herein may be robust against external impairments, such as background noise, jitter, power instability (such as amplitude instability), and/or pulse shape. In at least some embodiments, the de-skewing techniques described herein may be cheaper to implement than existing skew compensation techniques and may not require the use of calibrated skew measurements.

In some embodiments, the skew compensation methods described herein may be provided as a service to developers or manufacturers of transponders (including transponders that comply with C form-factor pluggable (CFP) multi-source agreements or variants thereof), or other types of equipment used in optical communication networks. For example, a service may be provided to de-skew prototypes of various products to ensure that they meet applicable requirements for I/Q skew, using the test systems and methods described herein (e.g., test systems that include relatively low-cost optical filters and power meters, rather than more expensive equipment, such as OMAs).

While various test systems and skew compensation methods are described herein primarily in terms of their use in de-skewing optical coherent transponders by analyzing measurements of the optical power of first harmonics of optical signals transmitted by the transponder, in other embodiments, the methods may include analyzing measurements of the optical power of other harmonics of the optical signals (e.g., second harmonics and beyond) instead of, or in addition to, analyzing measurements of the optical power of the first harmonics of the optical signals. In addition, while these test systems and skew compensation methods are described herein primarily in terms of their use in de-skewing optical coherent transponders, in other embodiments, these systems and techniques may be used to reduce the skew in other types of systems that generate two phase-coherent optical signals (to be subsequently combined) for which it may be useful to reduce the skew. As in the case in which the method is used to de-skew a transponder, the optimal amount of skew to be introduced into the signal to reduce the I/Q skew in another type of system under test may be determined by providing a sinusoidal input to the system, repeatedly measuring (using an optical power meter) the optical power of one or more harmonics of a sinusoidal output of the system while varying an amount of added skew, and (based on the skew being adding when the minimum power measurement is taken) calculating the optical amount of skew to compensate for the residual skew in the system.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for reducing in-phase/quadrature (I/Q) skew error in an optical coherent transponder, the method comprising:
performing a plurality of measurements of optical power of harmonics of an optical signal transmitted by the optical coherent transponder, each measurement being taken while a respective different amount of skew is introduced into the optical signal by a de-skewing filter of the optical coherent transponder;
identifying a minimum optical power value obtained during the plurality of measurements of optical power;
determining an amount of skew that was introduced by the de-skewing filter when the minimum optical power value was obtained;
modifying the optical coherent transponder to cause the amount of skew introduced by the de-skewing filter to be substantially equal to:
the amount of skew that was introduced by the de-skewing filter when the minimum optical power value was obtained plus an amount of skew representing a one-half symbol delay; or
the amount of skew that was introduced by the de-skewing filter when the minimum optical power value was obtained minus an amount of skew representing a one-half symbol delay.

2. The method of claim 1, wherein performing the plurality of measurements comprises:
taking a first measurement of optical power of the harmonics of an optical signal transmitted by the optical coherent transponder while a first amount of skew is introduced by the de-skewing filter; and
for each successive one of the plurality of measurements, varying the amount of skew introduced by the de-skewing filter by a fixed increment that is dependent on the minimum resolution by which the amount of skew is changeable.

3. The method of claim 1, wherein performing the plurality of measurements comprises varying the amount of skew introduced by the de-skewing filter to include amounts of skew over a range of values that represents two symbols of delay.

4. The method of claim 1, wherein:
performing the plurality of measurements of the optical power of the harmonics of the optical signal comprises taking measurements of the optical power of positive harmonics of the optical signal and taking measurements of the optical power of negative harmonics of the optical signal;
the identified minimum optical power value is obtained when taking a measurement of the optical power of a positive harmonic of the optical signal; and
modifying the optical coherent transponder causes the amount of skew introduced by the de-skewing filter to be substantially equal to the amount of skew that was introduced by the de-skewing filter when the minimum optical power value was obtained plus an amount of skew representing a one-half symbol delay.

5. The method of claim 1, wherein:
performing the plurality of measurements of the optical power of the harmonics of the optical signal comprises taking measurements of the optical power of positive harmonics of the optical signal and taking measurements of the optical power of negative harmonics of the optical signal;
the identified minimum optical power value is obtained when taking a measurement of the optical power of a negative harmonic of the optical signal; and
modifying the optical coherent transponder causes the amount of skew introduced by the de-skewing filter to be substantially equal to the amount of skew that was introduced by the de-skewing filter when the minimum optical power value was obtained minus an amount of skew representing a one-half symbol delay.

6. The method of claim 1, wherein modifying the transponder comprises changing a value of a configurable operating parameter of the de-skewing filter.

7. The method of claim 1, wherein:
the optical signal transmitted by the optical coherent transponder is a sinusoidal signal or a combination of sinusoidal signals;
the method further comprises filtering the optical signal to isolate a harmonic of the optical signal prior to performing the plurality of measurements.

8. The method of claim 1, wherein performing the plurality of measurements of the optical power of the harmonics of the optical signal comprises taking measurements of the optical power using an optical power meter.

9. The method of claim 1, wherein:
total skew in the optical coherent transponder comprises an electrical skew component, an optical skew component, and the amount of skew introduced by the de-skewing filter; and
the method is not dependent on a measurement of the total skew.

10. A system, comprising:
circuitry to:
receive optical signals transmitted by an optical coherent transponder under test;
an optical power meter comprising circuitry to:
perform a plurality of measurements of optical power of harmonics of an optical signal transmitted by the optical coherent transponder under test, each measurement to be taken while a respective different amount of skew is introduced into the optical signal by a de-skewing filter of the optical coherent transponder;
a skew compensator comprising circuitry to:
identify a minimum optical power value obtained during the plurality of measurements of optical power;
determine an amount of skew that was introduced by the de-skewing filter when the minimum optical power value was obtained; and
modify the optical coherent transponder to cause the amount of skew introduced by the de-skewing filter to be substantially equal to:
the amount of skew that was introduced by the de-skewing filter when the minimum optical power value was obtained plus an amount of skew to represent a one-half symbol delay; or
the amount of skew that was introduced by the de-skewing filter when the minimum optical power value was obtained minus an amount of skew to represent a one-half symbol delay.

11. The system of claim 10, wherein to perform the plurality of measurements, the optical power meter comprises circuitry to:
take a first measurement of optical power of the harmonics of an optical signal transmitted by the optical coherent transponder while a first amount of skew is introduced by the de-skewing filter; and for each successive one of the plurality of measurements, take respective measurements of optical power of the harmonics of optical signals transmitted by the optical coherent transponder while the amount of skew introduced by the de-skewing filter differs from the amount of skew introduced by the de-skewing filter during a preceding measurement by a fixed increment, wherein the fixed increment is dependent on the minimum resolution by which the amount of skew is changeable.

12. The system of claim 10, wherein to perform the plurality of measurements, the optical power meter comprises circuitry to take the plurality of measurements while the amount of skew introduced by the de-skewing filter is varied to include amounts of skew over a range of values that represents two symbols of delay.

13. The system of claim 10, wherein:
to perform the plurality of measurements, the optical power meter comprises circuitry to take measurements of the optical power of positive harmonics of the optical signal and to take measurements of the optical power of negative harmonics of the optical signal; and
to modify the optical coherent transponder, the system comprises circuitry to:
cause the amount of skew introduced by the de-skewing filter to be substantially equal to the amount of skew that was introduced by the de-skewing filter when the minimum optical power value was obtained plus an amount of skew to represent a one-half symbol delay if the identified minimum optical power value is obtained when a measurement of the optical power of a positive harmonic of the optical signal is taken; or
cause the amount of skew introduced by the de-skewing filter to be substantially equal to the amount of skew that was introduced by the de-skewing filter when the minimum optical power value was obtained minus an amount of skew to represent a one-half symbol delay if the identified minimum optical power value is obtained when a measurement of the optical power of a negative harmonic of the optical signal is taken.

14. The system of claim 10, wherein:
to perform the plurality of measurements, the optical power meter comprises circuitry to:
take measurements of the optical power of positive harmonics of the optical signal;
identify a minimum optical power value obtained while the measurements of the optical power of the positive harmonics of the optical signal are taken;
take measurements of the optical power of negative harmonics of the optical signal; and
identify a minimum optical power value obtained while the measurements of the optical power of the negative harmonics of the optical signal are taken; and
to modify the optical coherent transponder, the system comprises circuitry to cause the amount of skew introduced by the de-skewing filter to be substantially equal to an average of the amount of skew that was introduced by the de-skewing filter when the minimum optical power value was obtained while the measurements of the optical power of the positive harmonics of the optical signal were taken and the amount of skew that was introduced by the de-skewing filter when the minimum optical power value was obtained while the measurements of the optical power of the negative harmonics of the optical signal were taken.

15. The system of claim 10, wherein to modify the transponder, the system comprises circuitry to change a value of a configurable operating parameter of the de-skewing filter.

16. The system of claim 10, wherein:
the optical signal transmitted by the optical coherent transponder is a sinusoidal signal or a combination of sinusoidal signals;
the system further comprises one or more filters to isolate a harmonic of the optical signal prior to performance of the plurality of measurements.

17. The system of claim 10, wherein the optical power meter comprises an optical spectrum analyzer.

18. The system of claim 10, wherein:
total skew in the optical coherent transponder comprises an electrical skew component, an optical skew component, and the amount of skew introduced by the de-skewing filter; and
the modification of the optical coherent transponder causes a reduction in the total skew error in the optical coherent transponder.

19. A method for de-skewing an optical coherent transponder, comprising:
performing a plurality of measurements of optical power of harmonics of an optical signal transmitted by the optical coherent transponder, each measurement being taken while a respective different amount of skew is introduced by a de-skewing filter of the optical coherent transponder;
determining an amount of skew to be introduced by the de-skewing filter to reduce total skew in the optical coherent transponder; and
modifying the optical coherent transponder to cause the amount of skew introduced by the de-skewing filter to be substantially equal to the determined amount of skew;
wherein the total skew in the optical coherent transponder comprises an electrical skew component, an optical skew component, and the amount of skew introduced by the de-skewing filter; and
wherein determining the amount of skew to be introduced by the de-skewing filter is not dependent on a measurement of the total skew.

20. The method of claim 19, wherein determining the amount of skew to be introduced by the de-skewing filter comprises:
identifying a minimum optical power value obtained during the plurality of measurements of optical power;
determining an amount of skew that was introduced by the de-skewing filter when the minimum optical power value was obtained; and
applying an offset to the amount of skew that was introduced by the de-skewing filter when the minimum optical power value was obtained, wherein applying the offset comprises:
adding an amount of skew representing a one-half symbol delay to the amount of skew that was introduced by the de-skewing filter when the minimum optical power value was obtained; or
subtracting an amount of skew representing a one-half symbol delay from the amount of skew that was introduced by the de-skewing filter when the minimum optical power value was obtained.

* * * * *